United States Patent
Dick

(10) Patent No.: US 10,557,453 B2
(45) Date of Patent: Feb. 11, 2020

(54) HEAVING BUOY POINT ABSORBER

(71) Applicant: William Dick, Carlow (IE)

(72) Inventor: William Dick, Carlow (IE)

(*) Notice: Subject to any disclaimer, the term of this patent is extended or adjusted under 35 U.S.C. 154(b) by 0 days.

(21) Appl. No.: 14/902,772

(22) PCT Filed: Jul. 4, 2014

(86) PCT No.: PCT/EP2014/064385
§ 371 (c)(1),
(2) Date: Jan. 4, 2016

(87) PCT Pub. No.: WO2015/001115
PCT Pub. Date: Jan. 8, 2015

(65) Prior Publication Data
US 2016/0169188 A1 Jun. 16, 2016

(30) Foreign Application Priority Data
Jul. 5, 2013 (GB) .................................... 1312094

(51) Int. Cl.
*H02K 7/18* (2006.01)
*F03B 13/24* (2006.01)

(52) U.S. Cl.
CPC ........... *F03B 13/24* (2013.01); *H02K 7/1823* (2013.01)

(58) Field of Classification Search
CPC ....... F03B 13/24; F03B 13/20; H02K 7/1823; F05B 2270/18; Y02E 10/32; Y02E 10/38
See application file for complete search history.

(56) References Cited

U.S. PATENT DOCUMENTS 3,912,938 A * 10/1975 Filipenco .............. F03B 13/183
290/53
3,922,739 A * 12/1975 Babintsev ............... B63B 51/02
441/16

(Continued)

FOREIGN PATENT DOCUMENTS

GB 1530318 A 10/1978
JP 56-146074 11/1981

(Continued)

OTHER PUBLICATIONS

Notification Concerning Transmittal of International Preliminary Report on Patentability (Chapter I of the Patent Cooperation Treaty), issued by the International Bureau of WIPO, for PCT/EP2014/064385 dated Jan. 5, 2016, 10 pages.

*Primary Examiner* — Tulsidas C Patel
*Assistant Examiner* — Joseph Ortega
(74) *Attorney, Agent, or Firm* — Perkins Coie LLP

(57) ABSTRACT

A wave energy converter (100) is provided which comprises a heaving buoy point absorber (122) having a surface piercing float (120) operably coupled to an adjustable reference mass (125) defining a volume for accommodating sea water therein. The surface piercing float and the adjustable reference mass are configured to move together in response to passing waves. A chamber (105) provided within the surface piercing float is in fluid communication with the sea for trapping a volume of air above an enclosed column of water. The height of the enclosed column of water varies as the point absorber reacts against its surface via an adjustable air-spring. A power take off (140) is configured for being driven by a stream of vented air in communication with the chamber as the heaving buoy point absorber reacts against a trapped volume of air. A control mechanism is configured for (Continued)

tuning one or more operating characteristics of the heaving buoy point absorber.

28 Claims, 7 Drawing Sheets

(56) References Cited

U.S. PATENT DOCUMENTS

| | | | | | |
|---|---|---|---|---|---|
| 3,965,364 | A | * | 6/1976 | Gustafson | F03B 13/183 290/53 |
| 4,076,463 | A | * | 2/1978 | Welczer | F03B 13/187 417/331 |
| 4,249,084 | A | * | 2/1981 | Villanueva | F03B 13/187 290/53 |
| 4,277,690 | A | * | 7/1981 | Noren | F03B 13/187 290/42 |
| 4,286,347 | A | * | 9/1981 | Modisette | F03B 13/142 290/42 |
| 4,741,157 | A | * | 5/1988 | Nishikawa | F03B 13/142 290/53 |
| 4,773,221 | A | * | 9/1988 | Noren | F03B 13/187 60/497 |
| 5,136,173 | A | * | 8/1992 | Rynne | F03B 13/187 290/42 |
| 5,152,674 | A | * | 10/1992 | Marx | F03B 13/18 417/331 |
| 5,701,740 | A | * | 12/1997 | Tveter | F03B 13/1875 60/505 |
| 5,770,893 | A | * | 6/1998 | Youlton | F03B 13/142 290/42 |
| 6,140,712 | A | * | 10/2000 | Fredriksson | F03B 13/1855 290/53 |
| 6,226,989 | B1 | * | 5/2001 | Fredriksson | F03B 13/1855 60/501 |
| 6,402,459 | B1 | * | 6/2002 | Pauli | B63B 35/44 239/18 |
| 6,768,216 | B1 | * | 7/2004 | Carroll | F03B 13/148 290/42 |
| 6,933,624 | B2 | * | 8/2005 | Beaston | F03B 17/025 290/43 |
| 7,535,117 | B2 | * | 5/2009 | Montgomery | F03B 13/1865 290/42 |
| 8,629,572 | B1 | * | 1/2014 | Phillips | F03B 13/16 290/53 |
| 8,723,353 | B1 | * | 5/2014 | Franklin | F03B 13/20 290/42 |
| 9,885,337 | B2 | * | 2/2018 | Moffat | F03B 13/22 |
| 10,197,039 | B2 | * | 2/2019 | Alm | F03B 13/20 |
| 2006/0233613 | A1 | * | 10/2006 | Welch, Jr. | E02B 9/08 405/76 |
| 2007/0266704 | A1 | * | 11/2007 | Bull | B63B 35/4406 60/398 |
| 2008/0018114 | A1 | * | 1/2008 | Weldon | F03B 13/181 290/53 |
| 2008/0088133 | A1 | * | 4/2008 | Nagata | F03B 13/142 290/53 |
| 2008/0088134 | A1 | * | 4/2008 | Montgomery | F03B 13/1865 290/53 |
| 2008/0238103 | A1 | * | 10/2008 | Montgomery | F03B 13/1865 290/53 |
| 2010/0007147 | A1 | * | 1/2010 | Coulson | F03B 13/142 290/53 |
| 2010/0034670 | A1 | * | 2/2010 | Smith | F03B 13/187 417/53 |
| 2010/0043425 | A1 | * | 2/2010 | Dragic | F03B 13/1855 60/504 |
| 2010/0102562 | A1 | * | 4/2010 | Greenspan | F03B 13/1865 290/53 |
| 2010/0117367 | A1 | * | 5/2010 | Muller | H02K 3/47 290/53 |
| 2010/0164227 | A1 | * | 7/2010 | Grassi | F03B 13/20 290/52 |
| 2010/0283248 | A1 | * | 11/2010 | Moffat | F03B 13/22 290/52 |
| 2011/0036085 | A1 | * | 2/2011 | Oigarden | F03B 13/186 60/505 |
| 2011/0061376 | A1 | * | 3/2011 | McAlister | C25B 15/00 60/498 |
| 2011/0187102 | A1 | * | 8/2011 | Sirseth | F03B 13/145 290/42 |
| 2011/0304144 | A1 | * | 12/2011 | Dehlsen | E02B 9/08 290/53 |
| 2011/0308244 | A1 | * | 12/2011 | Findlay | F03B 13/1815 60/500 |
| 2012/0013126 | A1 | * | 1/2012 | Molloy | F03B 13/20 290/53 |
| 2012/0139261 | A1 | * | 6/2012 | Dick | F03B 13/20 290/1 C |
| 2013/0038063 | A1 | * | 2/2013 | Tawil | A01G 15/00 290/53 |
| 2013/0081535 | A1 | * | 4/2013 | Ntoukolianos | F03B 17/04 91/418 |
| 2013/0127168 | A1 | * | 5/2013 | Dragic | F03B 13/1855 290/53 |
| 2013/0134715 | A1 | * | 5/2013 | Sinclaire | E02B 9/08 290/54 |
| 2013/0145753 | A1 | * | 6/2013 | Becker | F01D 7/00 60/327 |
| 2013/0191043 | A1 | * | 7/2013 | Eitner | F03D 7/00 702/41 |
| 2014/0132003 | A1 | * | 5/2014 | Hayashi | F03B 13/20 290/53 |
| 2015/0063910 | A1 | * | 3/2015 | Meltsov | F03B 13/1815 405/21 |
| 2015/0345462 | A1 | * | 12/2015 | Hu | F03B 13/20 290/53 |

FOREIGN PATENT DOCUMENTS

| | | | | |
|---|---|---|---|---|
| WO | WO 99/22137 | * | 5/1999 | F03B 13/20 |
| WO | WO 99/22137 A1 | | 5/1999 | |

* cited by examiner

HEAVING BUOY POINT ABSORBER

FIELD OF THE INVENTION

The present invention relates to a wave energy converter. In particular, the present invention relates to a wave energy converter which comprises a heaving buoy point absorber that reacts against the surface of an enclosed volume of water via a trapped volume of air.

BACKGROUND

The greatest resource of wave energy is at off-shore sites with open exposure to the prevailing winds and at water depths greater than half a wave-length of the prevailing wave conditions. In practice, this means that the best ocean wave energy is at depths of the order of 100 metres or more.

Many wave energy conversion technologies include one or more bodies that oscillate in one or more modes as a result of excitation forces induced by the incident wave field and thus absorb energy as kinetic and potential energy. Necessarily such oscillating systems must themselves be large and massive and capable of reacting against another large and massive body or the Earth via a power take-off if significant energy is to be converted to useful power. The optimum size of such an oscillating system is defined by the prevailing wave-length, and economics. To be commercially viable at utility scale, a wave energy converter must operate effectively in large arrays in the most energetic offshore environments.

Axi-symmetric wave energy point absorbers are well suited for offshore deployment in large arrays; most of these are heaving buoy point absorbers which oscillate or heave in a vertical mode. These may typically react against the sea-bed via taut moorings or a spar, or be self-reacting by comprising more than one large oscillating body, or react against an internal mass, or an external inertial mass or plate. Reacting against the sea-bed requires that the spar or taut mooring is sufficiently secured or anchored to the sea-bed so that it will withstand the forces that correspond to power outputs of the order of a megawatt or more.

Such anchoring systems are expensive to install and maintain in deep water. Alternatives to such an approach include the provision of two or more large bodies reacting with each other through a power take-off. Such oscillating systems pose major engineering challenges to ensure that they can maintain alignment and continue to function for many million cycles and withstand stormy conditions. This essential need to react against something has posed a significant challenge to the development of practical, seaworthy and cost-effective oscillating wave energy absorbers, and in particular those devices that may be classed as self-reacting.

A further essential requirement of a heaving buoy point absorber is that its natural period of oscillation in the vertical mode or heave should be capable of matching that of the incident wave if maximum energy is to be absorbed, a condition known as resonance.

A heaving buoy point absorber tends to have a well-defined natural period in heave and as a result responds best and absorbs energy efficiently from a narrow band of the total energy distribution. Thus it is advantageous to be able to adjust the device's natural period. A number of compromise solutions have been proposed, such as latching, (where the oscillation is held or 'latched' momentarily to simulate a longer natural period) or increased damping so that the absorber's response is spread, but at the cost of reducing the peak.

Oscillating water columns (OWC) comprise a well-established class of wave energy converters and this technology has been applied in both on-shore and offshore systems. The water column within an OWC is activated by the incident waves. As with other oscillating wave energy absorbers, maximum energy absorption occurs when the natural oscillation of the water column, with the air trapped above it, is in step with the incoming wave train. This condition is closely defined by the geometry of the chamber that encloses the oscillating water column and the air above it.

A further well known implementation is to include an OWC as an integral part of a heaving spar buoy. A spar buoy is one where the width is small in comparison to the draught. The width of any point absorber should be small with respect to the prevailing wave length, not much more than 20 m in diameter for a typical ocean site. For periods in the range 8 to 14 seconds, an OWC of 10 metre radius would require water column lengths from 8 to 40 metres to ensure that the interior water column might resonate. Such a range of draughts is difficult to implement in practice. Furthermore, the available wave energy is much diminished at depths approaching 40 metres. An additional problem is the need to ensure that the oscillations of the heaving spar buoy and the enclosed OWC are out of phase otherwise it is difficult to recover power as there is no relative movement between the two oscillating systems.

Thus the development of a commercially viable point absorber wave energy converter has been hampered by a number of significant challenges, for example:

- Reacting against the sea-bed is costly to install and to maintain in deep water offshore.
- Self-reacting resonant heaving buoy point absorbers have heretofore required at least two massive bodies articulated via the power take-off, requiring careful alignment and end-stop control.
- Articulated devices tend to be less sea-worthy, more prone to failure, and more costly to manufacture and to maintain.
- The performance of a floating resonant OWC point absorber is constrained by the dimensions of the water column; adjusting this to suit varying wave conditions involves complications or, alternatively, a multiplicity of different water columns.
- A point absorber that incorporates an OWC in a surface-piercing buoy may have difficulty in ensuring an adequate phase difference between the oscillation of the internal water surface and the heaving buoy for effective power recovery across a typical wave energy distribution.

There is therefore a need for a wave energy converter which addresses at least some of the drawbacks of the prior art.

SUMMARY

These and other problems are addressed by a wave energy converter which comprises a resonant heaving buoy point absorber having a surface piercing float or buoy operably coupled to an adjustable reference mass defining a volume for accommodating sea water therein. A chamber is provided within the heaving buoy and is in fluid communication with the sea for trapping a volume of air above an enclosed column of water, the height of the enclosed column of water operably varying as the point absorber reacts against the trapped volume of air. A control mechanism is configured for tuning one or more operating characteristics of the point absorber.

Accordingly, the present teaching provides a wave energy converter as detailed in claim 1. Advantageous features are provided in the dependent claims.

These and other features will be better understood with reference to the followings Figures which are provided to assist in an understanding of the present teaching.

BRIEF DESCRIPTION OF THE DRAWINGS

The present teaching will now be described with reference to the accompanying drawings in which.

DETAILED DESCRIPTION OF THE DRAWINGS

Figure 1:
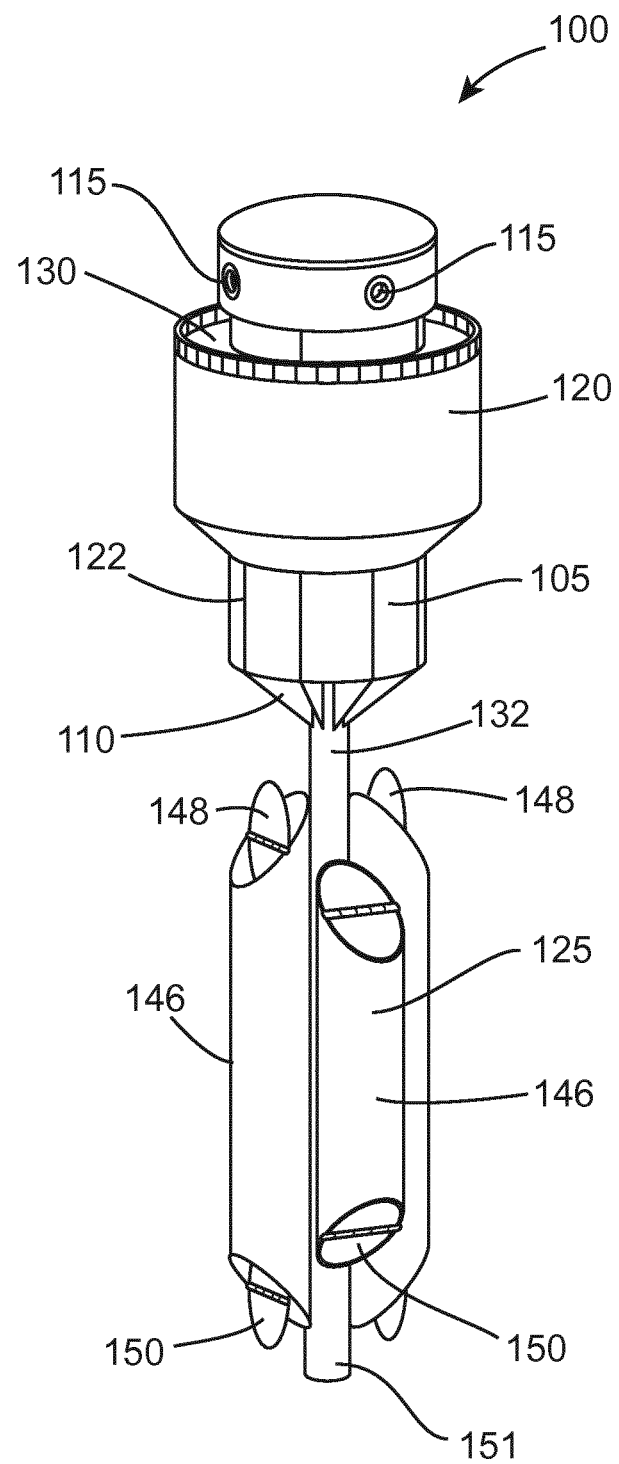
FIG. 1 is a perspective view of a wave energy converter in accordance with the present teaching.
Figure 2:
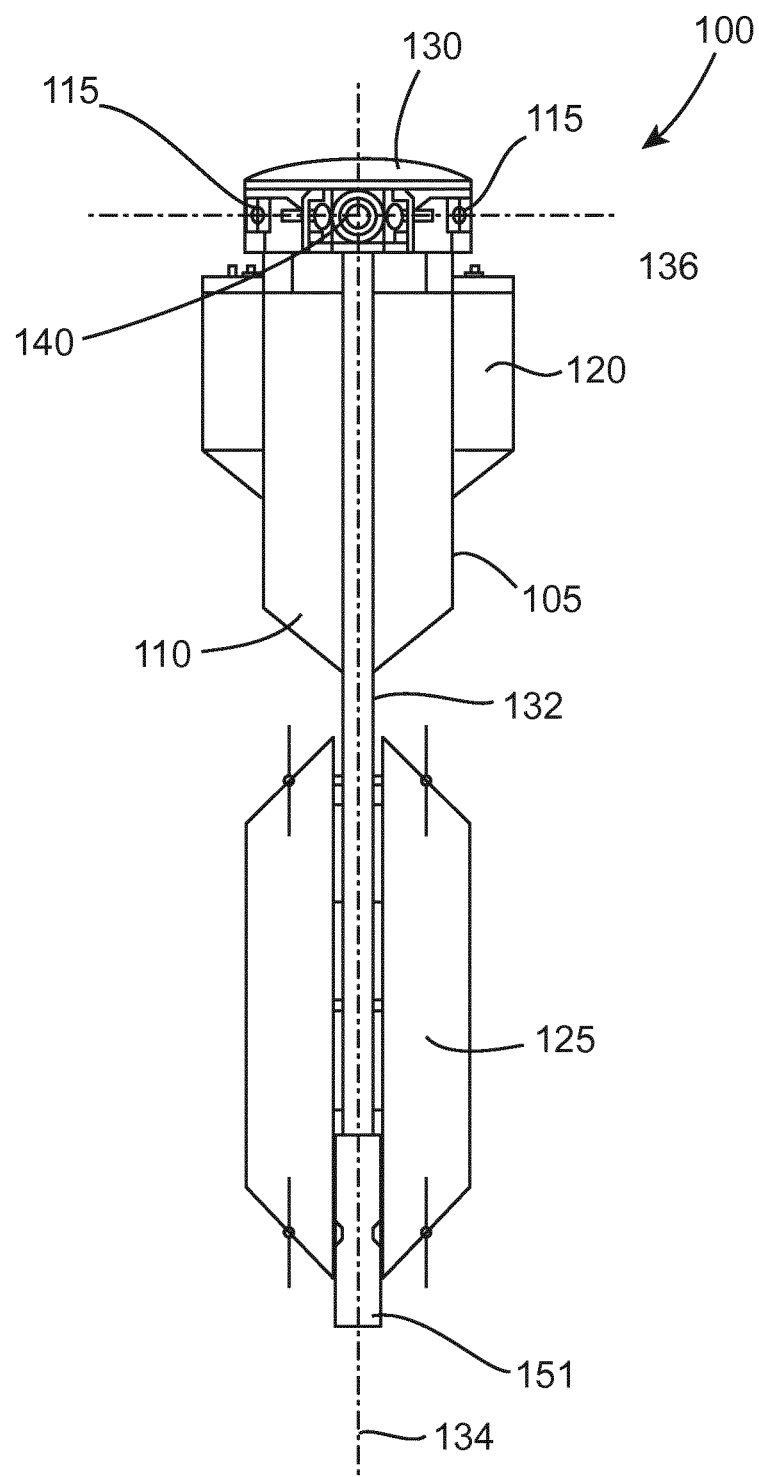
FIG. 2 is a side cross sectional view of the wave energy converter of FIG. 1.
Figure 3:
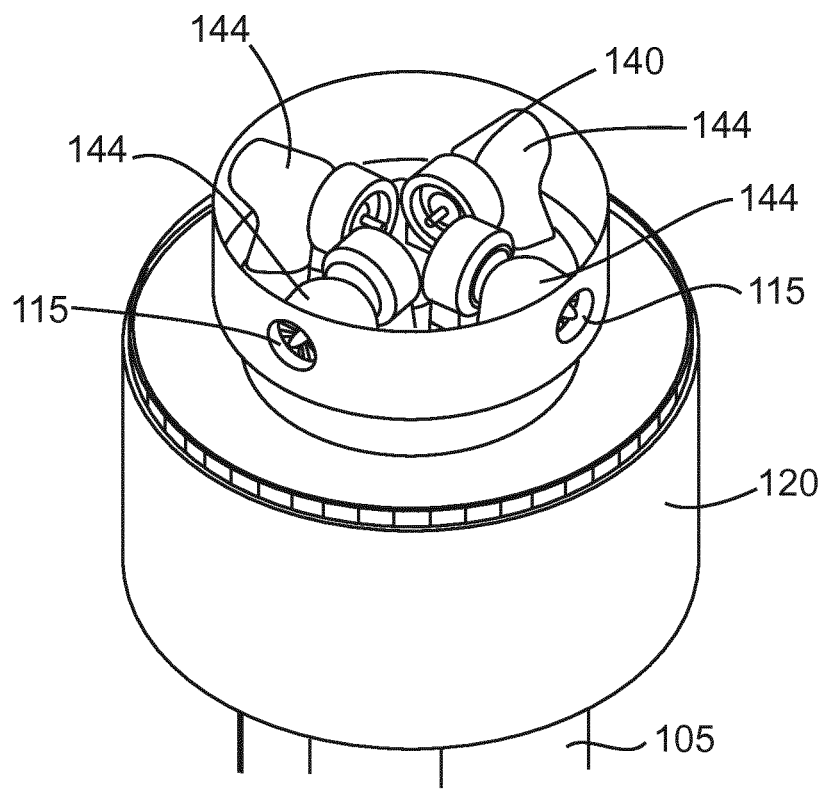
FIG. 3 is a perspective view of a detail of the wave energy converter of FIG. 1.
Figure 4:
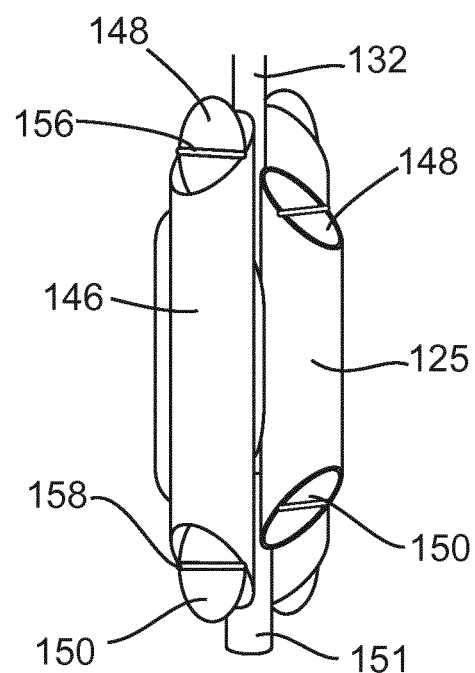
FIG. 4 is a perspective view of a detail of the wave energy converter of FIG. 1.

The present teaching will now be described with reference to an exemplary wave energy converter. It will be understood that the exemplary wave energy converter is provided to assist in an understanding of the present teaching and are not to be construed as limiting in any fashion. Furthermore, elements or components that are described with reference to any one Figure may be interchanged with those of other Figures without departing from the spirit of the present teaching. It will be appreciated that for simplicity and clarity of illustration, where considered appropriate, reference numerals may be repeated among the figures to indicate corresponding or analogous elements.

Referring to the drawings there is illustrated an exemplary wave energy converter 100 for harnessing wave energy. The exemplary wave energy converter 100 comprises a resonant heaving buoy point absorber 122 which includes a surface piercing float 120 operably coupled to an adjustable reference mass 125 and a ballast 151. In the exemplary aspect, the surface piercing float 120, the adjustable reference mass 125 and the ballast 151 are provided as single body which reacts against the sea surface in response to passing waves. A chamber 105 is formed within the surface piercing float 120 and defines a hollow interior region which is fluid communication with the sea via inlets 110 located adjacent the base of the chamber 105. The chamber 105 encloses a column of water and as a result a volume of air is trapped above the column of water. The air volume is vented to the atmosphere via a plurality of vents 115 through which air may be exhaled or inhaled.

The wave energy converter 100 oscillates in heave such that the internal top surface of the chamber 105 reacts against the internal water surface in the chamber 105 via the cushion of air trapped above the water column i.e., between the internal top surface of the chamber and the internal top surface of the water column. The natural period of heave of the point absorber 122 (wave energy converter 100) may be changed by one or more of:

controlling the amount of water trapped in the reference mass and at the same time the associated added mass,
controlling the restoring spring associated with the pressure of the air volume trapped above the internal water column.

This optimisation of the resonance of the heaving buoy is achieved through the use of the reference mass which can be adjusted to adjust the natural period of oscillation. It is estimated that 90% of the North Atlantic wave energy occurs with wave periods in the range 8 to 14 seconds, peaking close to 10 seconds. A floating heaving buoy will need to have a reference mass of the order of five times the displacement of the surface float if it is to have a natural period in heave of the order of 10 seconds.

While the enclosed water column may superficially resemble an OWC, it does not in fact operate like a traditional OWC device. In operation of an OWC, surface waves cause the internal water column to rise and fall. The surface float may itself heave vertically in response to wave action or the air pressure exerted by the OWC, but such heaving does not result in the point absorber expanding and compressing the trapped volume of air which in turn expands and compresses the column of sea water. The oscillating water column is driven by the waves (and not the point absorber) and this is how energy is absorbed by these devices. However, in the present teaching the level of the internal water surface will oscillate primarily as result of the force exerted on the internal water surface by the air volume above it which will be compressed and expanded by the oscillations of the wave energy converter 100. The entire converter 100 oscillates in resonance in response to passing waves such that a roof of the chamber 105 acts like a piston to compress the trapped air volume. In a traditional OWC device it is the volume of water which oscillates and behaves like a piston. It will be appreciated therefore that functionally the two are diametrically opposed.

The surface piercing float 120 is preferably axi-symmetric and is integral with the outer surface of the chamber 105. The surface piercing float 120 is of sufficient draught and free-board to accommodate the anticipated heave response of the entire wave energy converter 100. The draught of the surface piercing float 120 is typically a few metres, meaning that it is well adapted to benefit from the forces exerted by the surface waves. The term free-board is a nautical term which refers to the height of the surface piercing float 120 that is above the water level. The term draught is intended to refer to the depth of a loaded surface piercing float 120 in the water, taken from the level of the waterline to the lowest point of the surface piercing float 120.

The adjustable reference mass 125 is configured to trap a volume of sea water therein in order to provide a neutrally buoyant mass which is co-operable with the surface piercing float 120. The neutrally buoyant mass together with the associated added mass encourages the wave energy converter 100 to oscillate at a frequency that corresponds to or is close to the peak frequency of the prevailing wave climate.

Ballast 151 is required to ensure that the surface piercing float 120 sits at the correct draught/water line in still water and to help stabilise the wave energy converter 100 in water. For the purpose of stabilisation the ballast must be placed below, preferably well below, the centre of buoyancy. It can be seen from the figures that the ballast is preferably placed at the bottom of an elongated central spine 132.

It is also essential that the ballast is of significantly greater specific gravity than water. As is known to the person skilled in the art, a number of materials are suitable for the ballast. Preferably lead is used. Iron can also be used but is prone to rusting. Practical options are iron embedded in concrete or high density concrete alone. Some or all of this ballast 151 may be placed at the lowest point of the point absorber 122 (bottom of elongated spine 132) or distributed vertically (along the spine 132) as may be required to improve stability and to avoid or mitigate unwanted oscillations such as parametric roll.

As mentioned above, the ballast provided on the converter 100 dictates how high/low the surface piercing float and correspondingly the converter as a whole sits in the water.

The position of the surface-piercing float in still water should be such that, in normal operation, the heave response of the heaving buoy point absorber when resonating is within the available length of draught plus freeboard, ensuring that the converter displaces a volume of water in each cycle that is appropriate for the incident wave field, known as the participating volume. This heave response is closely related to the totality of the reference mass, the buoyancy restoring force from the float, the air spring associated with the plenum above the water column, and the reaction or damping exerted by the pneumatic power take-off.

It will be appreciated that the ballast 151 and reference mass 125 are separate entities performing different functions. The ballast is fixed ballast, has weight in water, and has a mass much less than that of the reference mass. The reference mass comprises inertial mass (trapped water) and added mass when moving and is neutrally buoyant. It may be varied from a large value (typically several thousand tonnes) to virtually nothing, The elongated column of the chamber 105 is closed at the upper end thereof by a deck 130. The elongated central spine 132 extends from the deck 130 to a lower end of the adjustable reference mass 125. The chamber 105, the float 120 and the adjustable reference mass 125 are preferably mounted on and rigidly connected to the central spine 132. The central spine 132 defines a longitudinal axis 134. The vents 115 define transverse axes 136 which are substantially perpendicular to the longitudinal axis 134. As the converter 100 heaves in response to the incident sea waves it tends to compress and expand the air volume over the water column in the chamber 105 and this also causes the level of the water column (which is open to the sea via the bottom inlets 110) to oscillate with respect to the heaving buoy 120. A power take-off (PTO) 140 is operably arranged with respect to the vents 115 such that a stream of air may be exhaled to or inhaled from atmosphere through ducts to the PTO 140. In the exemplary arrangement, the PTO 140 includes air turbines 142 which drive generators 144, best illustrated in FIG. 7, to generate electricity as air is forced out or drawn in through the vents 115. In the exemplary arrangement the turbines 142 are uni-directional impulse turbines in that one turbine-generator set may be driven by an air stream being forced out through a first set of vents 115 as the air pressure rises in the chamber 105 and another similar turbine-generator set is driven by an air stream inhaled through a second set of vents 115 as the air pressure falls in the chamber 105.

The generators 144 may be controlled to vary the reaction against the torque applied to the shafts of the turbines 142. This modifies the damping resistance offered by the turbines 144 to the passing air stream and in turn alters the rate of change of the air pressure over the enclosed water column in the chamber 105. In an exemplary arrangement, the generator field currents are controlled by a controller that determines the appropriate reaction that will optimise overall performance of the heaving point absorber 122 and will do so in response to sensed on-board and/or externally provided operating characteristics. The sensed operating characteristics may include one or more of the following, but not limited to, the velocity and amplitude of the rise or fall of the internal water surface in the chamber 105, the velocity and amplitude of oscillation of the heaving buoy point absorber 120, and the air pressure in the chamber 105 above the oscillating water column. The combination of a heaving buoy 120 which is configured to resonate or oscillate with a natural period close to that of the prevailing wave climate and its enclosed oscillating water column which also oscillates relative to the heaving buoy may be controlled such that the two oscillating systems may be maintained out of phase. Such an arrangement enhances the amount of power which may be recovered from the system as a whole.

The adjustable reference mass 125 provides a large and neutrally buoyant mass of trapped sea-water. A converter 100 will absorb most energy when its natural period matches that of the incident wave field and resonance may be achieved. It is the use of reference mass that primarily ensures that the converter 100 has a natural period in heave that may (can be set to) correspond with the spectral peak frequency of the incident waves. The reference mass comprises inertial and (when moving) added mass. The added mass is determined from the geometry and configuration of the device and may require complex analysis to determine its value. This can be determined from standard modelling such as computational fluid dynamics. The reference mass may typically be varied to suit the prevailing weather ('storm-by-storm' control) without altering the buoyancy of the converter.

The relationship between reference mass, wave period and water plane is approximately represented by the formula:

$$T = 2\pi \sqrt{\frac{M_f + M_{added}}{\rho g A}}$$

where T is the wave period, $M_f$ the inertial mass (ie trapped sea water), $M_{added}$ is the added mass and is determined from the geometry and configuration of the device, $\rho$ is the density of sea water, g is gravity, and A is the water-plane area of the surface-piercing float 120. Typical values for different periods are approximately as follows, for a point absorber with a surface-piercing float of say 16 metre diameter:

| Wave period (seconds) | Total mass + added mass [Kg] | of which, inertial mass [Kg] |
| --- | --- | --- |
| 10 | 5.1193e+006 | 4.8156e+006 |
| 12 | 7.3719e+006 | 7.0681e+006 |
| 14 | 1.0034e+007 | 9.7302e+006 |

Thus, it is apparent that this arrangement of the variable reference mass benefits from a correspondingly variable added mass. The proportion of added mass may be increased by altering the geometry of the tanks. Both the sea-water and the added mass are freely available. The known wave climate of the selected site will help decide on the optimum combination of (fixed) water plane area and (variable) reference mass.

There is a marked seasonal variation in wave energy flux (change in wave period) in the more energetic sites such as those off NW Europe and the American West Coast. Changing the reference mass, as described, results in the same point absorber's response curve to be shifted in proportion to the square root of the change in mass. This facilitates greater overall energy absorption. Specifically, the reference mass can be adjusted when the wave period changes to maintain wave energy absorption efficiency.

In another example, using the above equation, with a 10 second period wave, this indicates that a total mass of approximately 8,000 kgs is required for a 10 metre radius surface piercing float 120. A float draught of 5 metres would be practical at this scale, i.e. displacing 1,570 m$^3$ in still water. Ensuring that a 1,570 m$^3$ displacement may support an 8,000 tonne mass may be achieved by having a reference mass that is close to neutrally buoyant. The trapped water mass is weightless in water, but its mass is of the order of five times the displacement of the surface-piercing heaving buoy 120, thus making it possible for the point absorber 122 to have a natural period in heave similar to that of the incident waves. This inertial mass may readily be altered by adjusting the volume of water in the adjustable reference mass 125 and thus altering the natural frequency of the heaving absorber. A control mechanism 700 (FIG. 7) is co-operable with the adjustable reference mass for controlling the volume of water trapped therein.

The adjustable reference mass 125 comprises a plurality of volumes which facilitates the configuring of the neutral buoyancy mass of the trapped water to be tuned to the prevailing wave regime where the wave energy absorber 100 is operating. In the exemplary arrangement, the adjustable reference mass 125 comprises a plurality of elongated hollow tubular members 146 which have a first valve member 148 and second valve member 150 operably coupled at respective opposite ends thereof. The lengths of the tubular members 146 are not all the same in that at least two of the tubular members 146 are of different lengths to each other. Providing the tubular members 146 with different lengths means that the adjustable reference mass 125 has a number of different sized volumes that may be used to trap sea water. Thus, the reference mass 125 has a number of different sized volumes which may be selectively charged with water for tuning the neutral buoyancy mass of the trapped water to the prevailing wave regime. In the exemplary arrangement, the respective ends of the tubular members 146 are slanted and the valve members 148, 150 are provided as pivotable flaps. Each first valve member 148 is rotatable about a first axis of rotation 156, and each second valve member 150 is rotatable about a second axis of rotation 158. The adjustable reference mass 125 is a beneficial combination of actual inertial mass and added mass (virtual mass) and may be streamlined in order to reduce losses arising from viscous drag. The term added mass is commonly used in fluid mechanics and refers to the inertia added to a system because an accelerating or decelerating body must move a volume of surrounding fluid as it moves through the surrounding fluid. Venting the tubular members 146, at the same time releasing a fraction of the trapped water reduces much of the added mass associated with the cross-section of the tubular members 146. This facilitates a resonant response at various positions in the distribution of wave energy.

The valves members 148, 150 may typically be controlled in response to changes in the weather conditions. The heave response of the heaving buoy point absorber 120 is minimised when all valve members 148, 150 are open. For example, during maintenance it may be desirable to minimise the heave response of the heaving buoy point absorber 120 by opening the valve members 148, 150. The valve members 148, 150 are preferably weighted such that they require to be pulled and held closed ('energised closed') and will then open in the absence of an applied force. In this way, the converter 100 will be arranged to automatically fail safe with all valves open in the event of a technical failure on board, or extreme seas, or a failure in the grid connection, for example.

The control mechanism 700 (FIG. 7) is operably coupled to the first and second valve members 148, 150 for opening and closing the valves. The first and second valve members 148, 150 operate in pairs such that both are open or both are closed simultaneously.

When a pair of first and second valve members are closed, a volume of water is trapped in the corresponding tubular member 146. The size of the volume of water which is trapped depends on the volume defined by the hollow interior region of the respective tubular member 146.

Correspondingly when a pair of first and second valves are open no sea water is trapped in the corresponding tubular member 146. Thus it will be appreciated that selectively operating the first and second valves 148, 150 in pairs allows the neutral buoyancy mass of the trapped water to be tuned to an operating characteristic of the point absorber 122. The added mass associated with the cross-section of the vented tube will also be reduced provided that the tube is of adequate diameter in proportion to its length. A sensor (not shown) may be provided for sensing an operating characteristic of the heaving buoy point absorber 120 and the corresponding incident wave pattern over a pre-determined period of time. An on-board programmable logic circuit (PLC) may be incorporated to analyse the sensed data/recorded data and determine which pair of valve members 148, 150 to open or close. The inertial mass may readily be altered by controlling the valve members 148, 150, thus facilitating a resonant response at different spectral peak frequencies within the distribution of wave energy. It will be appreciated therefore that the resonant response of the wave energy converter 100 may be tuned to suit the weather conditions.

When two oscillating systems are combined as in a device provided in accordance with the present teaching, the damping control has the further advantage of being able to affect both the response of the water column and the enclosing heaving structure, the latter by altering the air pressure over the internal water surface, effectively altering its spring constant. Hydrodynamic analysis has confirmed that the maximum phase angle of 180° between the oscillating water column and the heaving structure may be achieved.

A wave energy converter of the present teaching is configured such that the body supported by surface piercing float 122 and containing the chamber 105 oscillates in response to passing waves. Thus the present teaching combines two oscillating bodies, namely, the heaving buoy point absorber 120 which heaves in response to the surface waves and a column of water that may oscillate within the enclosed chamber 105 at least partially in response to variations in the air pressure above it caused by forces exerted by the heaving buoy point absorber 120. The air pressure above the water column may be modified by varying the torque resistance of the generators 144 and hence the damping effect of the rotary turbine blades 142. This has the further advantage of being able to affect both the response of the water column and the enclosing heaving structure, the latter effectively modifying the spring constant of the heaving buoy point absorber.

Thus the present teaching makes it possible to alter the two key variables in a heaving buoy point absorber, the reference mass 125 and that part of the restoring spring associated with the air enclosed in chamber 105. In typical operations the reference mass would be adjusted when there are significant changes in the weather (known as 'storm by storm' control) and the air spring would be continuously modified (known as 'wave by wave' control).

The advantages of the present teaching are many and may be demonstrated using computer modelling.

A hydrodynamic model of the heaving buoy point absorber was developed and from this a computer programme that computes the responses in a given wave climate. The model was extended to take account of the interactions of the heaving buoy and the trapped water column and the air chamber above it. The time-dependent mass of the trapped water column, its added mass, stiffness due to its water plane area in contact with the trapped air, hydrodynamic damping, drag force and fluid inertial force were all incorporated. A power matrix was determined for an exemplary wave climate, off Co Mayo Ireland.

Figure 5:
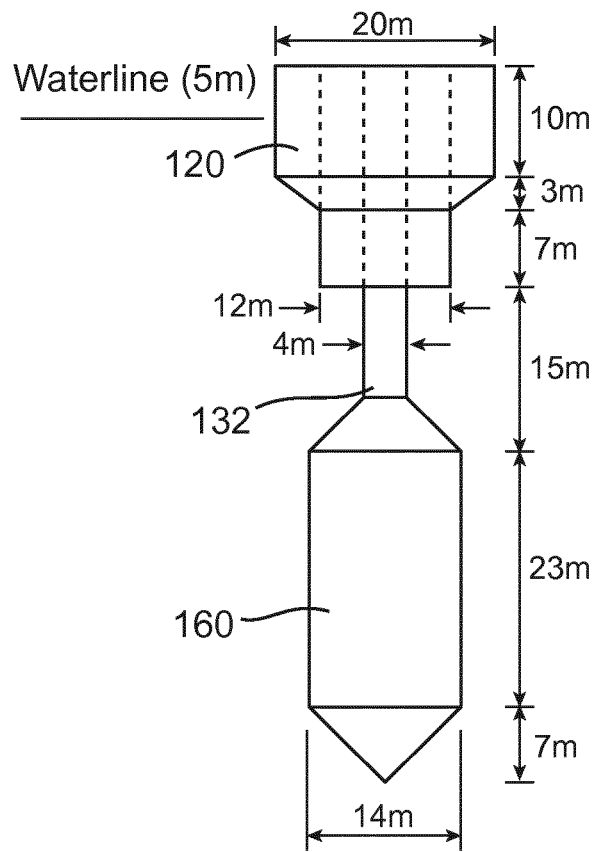
FIG. 5 is a computer model of a wave energy converter.

The results of the numerical solution of the hydrodynamic model were then compared with those from an industry standard hydrodynamics package WAMIT, and a computational fluid dynamics (CFD) analysis using Flow-3D, suitable for surface-piercing floating structures. The results demonstrate the wave energy converter 100 performs well as a heaving buoy that reacts against an internal water surface of the enclosed water column. The results from the WAMIT will now be described. The wave energy absorber 100 was modelled using the model of FIG. 5 as a slack moored, axi-symmetric, surface-piercing heaving buoy incorporating an air cushion above a column of water open to the sea below. A large reference mass and ballast was provided at the base 160 to represent the adjustable reference mass 125. Exemplary dimension of the model are illustrated in FIG. 5. The model was defined having the following characteristics:

| | |
|---|---|
| Draft: | 60 meters |
| Dry mass: | 550 tonnes |
| Total mass: | 8200 tonnes |
| Volume: | 9200 m$^3$ |
| Metacentric height (GM): | 9.5 meters |

Dry mass is the actual structural mass of the entire device including ballast. Total mass includes the weight of the trapped seawater but excludes added mass A computer aided design (CAD) model of the wave energy converter 100 was simulated to the exemplary dimensions provided in FIG. 5. The appropriate mass values are assigned to the individual components and the hydrostatics were resolved. These values, along with an appropriate geometry file, were passed to WAMIT for device performance simulation in linear, monochromatic, deep water waves of 3 m height and over a range of wave periods from 4-15 seconds. The device response was recorded for the 6 rigid body modes of motion and two additional modes (heave and pitch) for the free surface within the oscillating water column as characterised by a massless free surface patch. The WAMIT simulation outputs non-dimensional data pertaining to the frequency dependent added mass and damping values for the platform, the hydrostatic stiffness, and the response amplitude operators for each of the 8 modes of motion. These values were imported to MatLab™ for re-dimensionalisation, and characteristic assessment.

Figure 6:
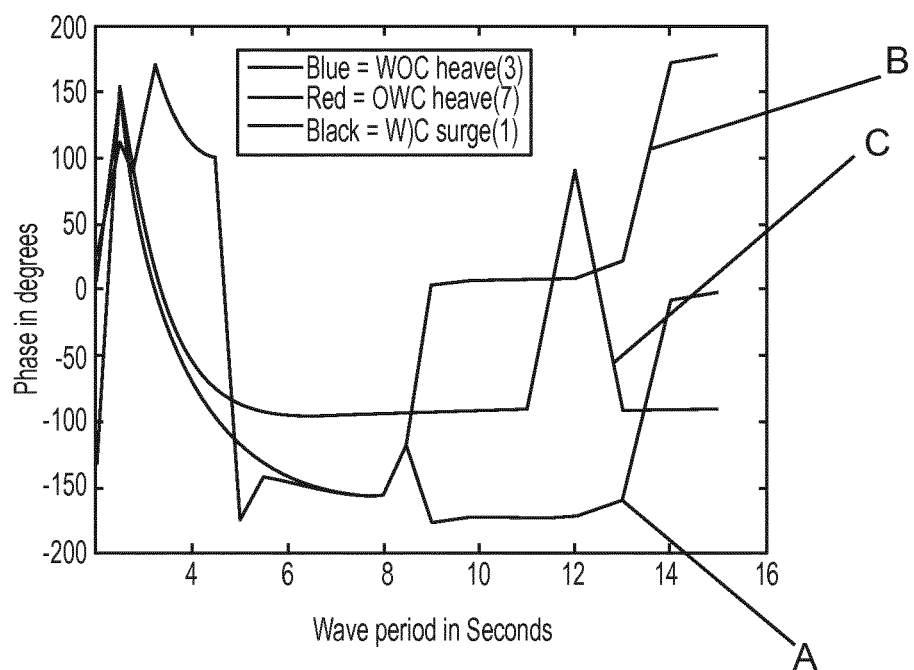
FIG. 6 is a graph generated using the computer model of FIG. 5.

FIG. 6 shows the phase relationships between the structural heave mode (line A), the internal water surface heave mode (line B) and the structural surge mode (line C). The surge response amplitude was small. The lines illustrate that over a range of wave periods from approximately 8 seconds to 13 seconds the internal water surface and structural heave modes are ~180° out of phase. This means that there is significant power generation potential for this exemplary geometry in a typical North Atlantic wave climate, for example.

Figure 7:
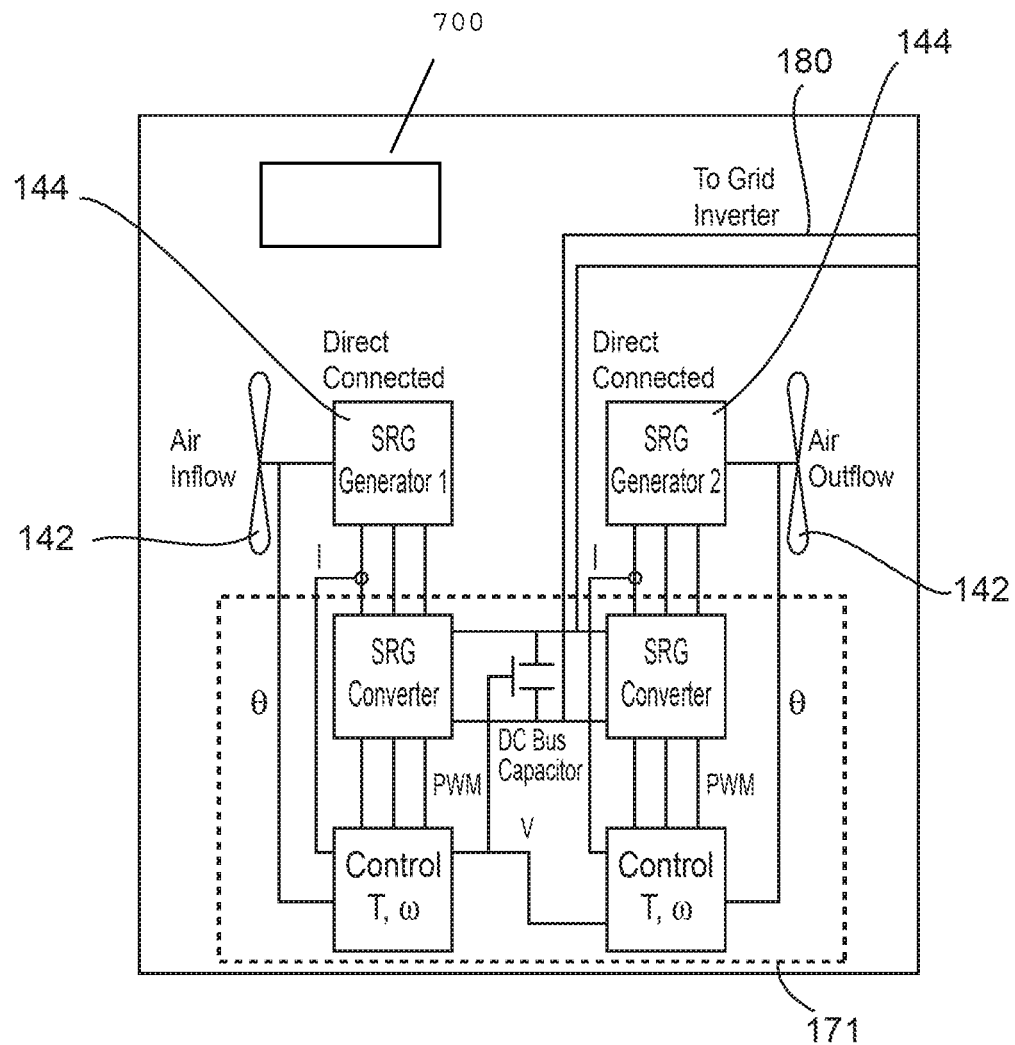
FIG. 7 is a diagrammatic representation of a power take off.
Figure 8:
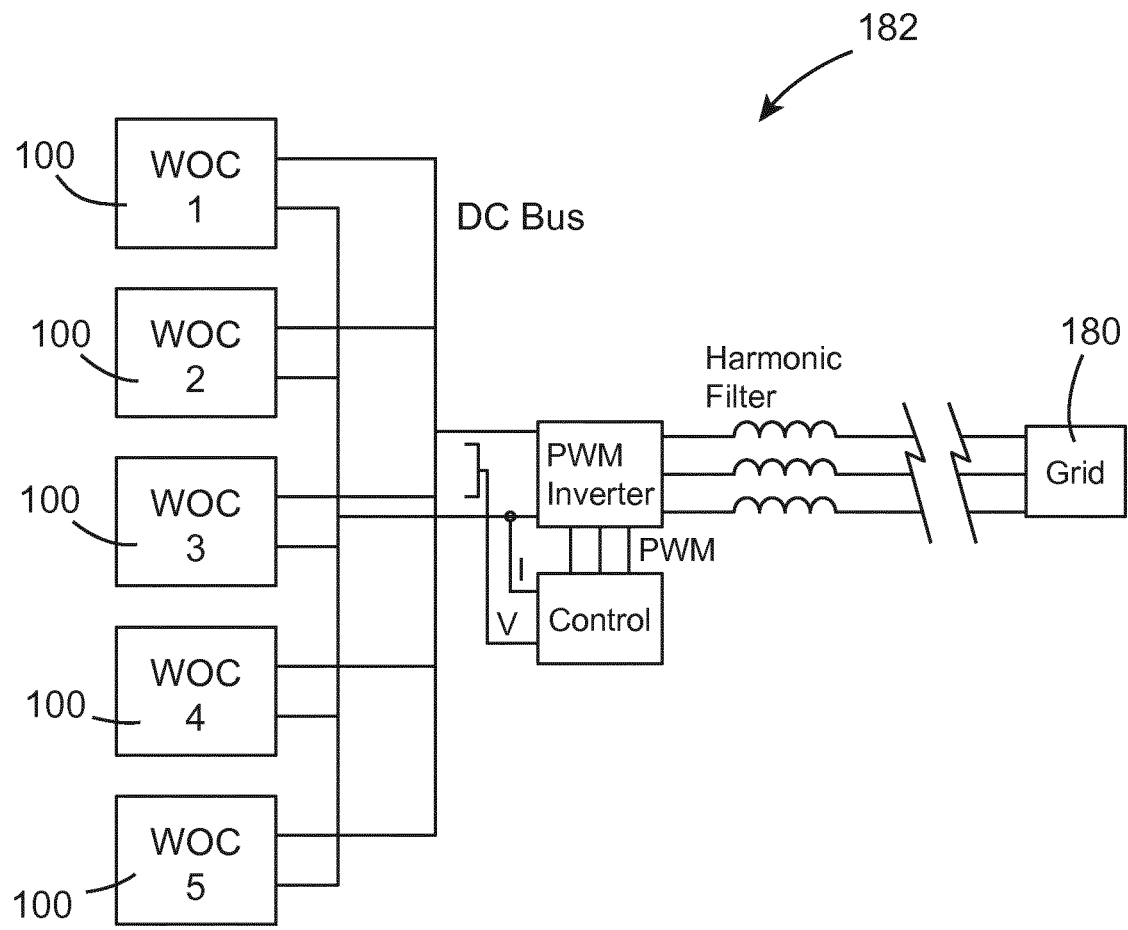
FIG. 8 is block diagram of a plurality of wave energy converters operably coupled together.

The PTO 140 is illustrated in more detail in FIG. 7. This illustrates a preferable set-up that incorporates at least one pair of uni-directional impulse turbines, one for inhalation, one for exhalation, each coupled to a rotary switched reluctance generator. An alternative set-up may use one or more bi-directional turbines such as the Wells or Dennis-Auld turbines and conventional permanent magnet synchronous generators. Preferably switched reluctance generators 144 are directly connected (without gear boxes) to the inlet and outlet impulse turbines. Switched reluctance generators are well suited to the variable loads typical of renewable energy resources. They are robust, fault tolerant and efficient even at very low rpm. They allow rapid control of shaft torque for optimal wave energy absorption. By increasing or decreasing the shaft torque applied by the generators the damping effect exerted by the air turbines may be tuned to control the response of the chamber 105. A control circuit 171 is operable for controlling the operating modes of the switched reluctance generators 144. FIG. 8 illustrates an exemplary wave farm 182 which includes five wave energy absorbers 100 that provide power to the electrical grid 180.

Figure 9:
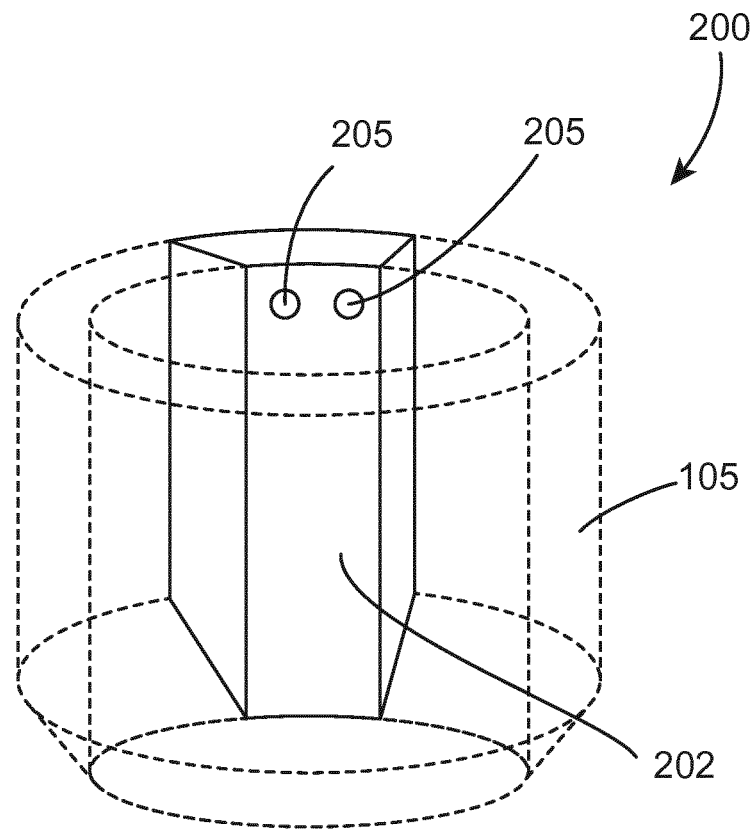
FIG. 9 is a perspective view of a detail of a wave energy converter.

Referring now to FIG. 9 there is provided a short-term energy storage mechanism 200 having a plurality of air tanks 202 incorporated as air-tight bulk-headed sections within the heaving buoy 120. For clarity, only a single air tank 202 is illustrated. However, it will be appreciated that a plurality of such air tanks 202 may be provided side by side along the circumference of the chamber 105. This air storage mechanism is configured to smooth power delivery and overall performance during irregular seas, and may be employed as an additional mechanism to control the response of the heaving buoy 120. The air tanks 202 are operable to store excess air pressure that may arise in the chamber 205. The air tanks 202 are in fluid communication with the trapped air volume above the water column in the chamber 105. Valves 205 are provided at the upper end of the air tanks 202 which may be activated for controlling the flow of air entering or exiting the tanks 202.

A control mechanism is operable for selectively controlling the valves 205 for facilitating the charging of air to or from the chamber 105 to the air tanks 202 in order to store and recover excess energy. In periods of more energetic and irregular waves the air pressure within the chamber 105 during any one cycle may be exceed what is required for the efficient operation of the turbines. Rather than wasting this energy by venting it to the atmosphere, it may be stored temporally in the air tanks 205. The control mechanism is operable for selectively controlling the valves 205 for releasing pressurised air from the air tanks 202 into the chamber 105 in order to enhance performance when smaller waves occur.

While it is not intended to limit the present teaching to any specific technical understanding it will be appreciated from the foregoing that the trapped air volume may be considered as forming or defining a spring. This forms part of the PTO. As result of the wave motion, the heaving buoy reacts against the column of water. As the column of water has substantial mass and inertia it attempts to resist this reaction. As a result the partially trapped water-mass is forced to oscillate and may do so out-of-phase with the heaving buoy. The dynamics of interaction motion is sensed by the air-spring defined by the air volume and used to drive the PTO.

While the present teaching has been described with reference to exemplary arrangements it will be understood that it is not intended to limit the teaching of the present invention to such arrangements as modifications can be made without departing from the spirit and scope of the present teaching.

The words comprises/comprising when used in this specification are to specify the presence of stated features, integers, steps or components but does not preclude the presence or addition of one or more other features, integers, steps, components or groups thereof.

The invention claimed is:

1. A wave energy converter comprising:
   a resonant heaving buoy point absorber which oscillates with a natural frequency of movement in a vertical direction approximate to the frequency of passing waves, the absorber comprising a surface piercing float operably rigidly coupled to an adjustable reference mass and a ballast, the ballast having a fixed mass and the adjustable reference mass defining a volume for accommodating sea water therein, wherein the adjustable reference mass comprises at least one aperture for accommodating sea water therethrough, the at least one aperture having an associated valve member, and further wherein the adjustable reference mass defines an inertial mass and is neutrally buoyant, the inertial mass being altered by operatively using the valve member to adjust the volume of sea water in the adjustable reference mass thereby altering the natural frequency of the heaving buoy point absorber, the surface piercing float, the adjustable reference mass and the ballast being configured to rise and fall together in response to passing waves;
   a chamber provided within the surface piercing float and defining a hollow interior region which is operably in fluid communication with the sea water via openings located adjacent a base of the chamber to effect a trapping of a volume of air between a top surface of a column of sea water and a top surface of the chamber, the height of the top surface of the column of sea water mimicking the height of the sea surface outside the chamber, the chamber being configured such that operably the movement of the resonant heaving buoy point absorber in response to the wave conditions expands and compresses the trapped volume of air against the column of sea water such that an internal top surface of the chamber reacts against the column of sea water in the chamber via the air trapped above the water column; and
   a power take off, PTO, in communication with and responsive to air vented from the chamber resultant from a reaction of the heaving buoy point absorber against the top surface of the enclosed column of sea water, and
      wherein operably the volume of accommodated sea water has a mass which is of the order of five times the displacement of the resonant heaving buoy point absorber so that resonance may be achieved.

2. The wave energy converter according to claim 1 further comprising a control mechanism configured for tuning one or more operating characteristics of the resonant heaving buoy point absorber.

3. The wave energy converter as claimed in claim 2, wherein the control mechanism is operable to vary damping exerted by the PTO.

4. The wave energy converter as claimed in claim 2, wherein the control mechanism is operable to effect a selective varying of the volume of sea water contained within the adjustable reference mass.

5. The wave energy converter as claimed in claim 4, wherein the control mechanism is operable to control the volume of sea water within the adjustable reference mass such that the natural frequencies of the point absorber and the enclosed water column within the chamber are out of phase.

6. The wave energy converter as claimed in claim 1, wherein the adjustable reference mass comprises a plurality of apertures for accommodating water therethrough.

7. The wave energy converter as claimed in claim 6, wherein the plurality of apertures have associated valve members.

8. The wave energy converter as claimed in claim 7, wherein the plurality of valve members are selectively operable for controlling the volume of water in the adjustable reference mass.

9. The wave energy converter as claimed in claim 8, wherein the adjustable reference mass defines a plurality of individual volumes.

10. The wave energy converter as claimed in claim 9, wherein the plurality of individual volumes are elongated.

11. The wave energy converter as claimed in claim 9, wherein the adjustable reference mass comprises a plurality of tubular members.

12. The wave energy converter as claimed in claim 11, wherein each tubular member extends between a first valve member and a second valve member.

13. The wave energy converter as claimed in claim 12, wherein the length of at least two of the tubular members are different to each other.

14. The wave energy converter as claimed in claim 1, wherein the PTO comprises one or more air turbines.

15. The wave energy converter as claimed in claim 14, wherein the one or more air turbines have an associated resistance to air flow.

16. The wave energy converter as claimed in claim 15, wherein the one or more air turbines are configurable such that their associated resistance to air flow is adjustable.

17. The wave energy converter as claimed in claim 16, wherein at least one of the one or more generators is a switched reluctance generator.

18. The wave energy converter as claimed in claim 1 wherein the chamber is open to the sea water at a lower portion of the surface piercing float.

19. The wave energy converter as claimed in claim 1 wherein the trapped volume of air is sandwiched between an upper surface of the enclosed column of sea water and the point absorber.

20. The wave energy converter as claimed in claim 1 wherein the trapped volume of air forms an adjustable air spring.

21. The wave energy converter as claimed in claim 1 wherein the ballast is positioned at the bottom of the wave energy converter.

22. The wave energy converter as claimed in claim 1 wherein the ballast comprises at least one of lead, iron, and concrete.

23. A wave energy converter comprising:
- a resonant heaving buoy point absorber which oscillates with a natural frequency of movement in a vertical direction approximate to the frequency of passing waves, the absorber comprising a surface piercing float operably rigidly coupled to an adjustable reference mass and a ballast, the ballast having a fixed mass and the adjustable reference mass defining a volume for accommodating sea water therein, the adjustable reference mass defining an inertial mass and being neutrally buoyant, wherein the adjustable reference mass comprises at least one aperture for accommodating sea water therethrough, the at least one aperture having an associated valve member, and further wherein the inertial mass operatively is altered by using the valve member to adjust the volume of sea water in the adjustable reference mass thereby altering the natural frequency of the heaving buoy point absorber, the surface piercing float, the adjustable reference mass and the ballast being configured to rise and fall together in response to passing waves;
- a chamber provided within the surface piercing float and defining a hollow interior region which is operably in fluid communication with the sea water via inlets located adjacent a base of the chamber to effect a trapping of a volume of air between a top surface of a column of sea water and a top surface of the chamber, the chamber being configured such that operably the resonant heaving buoy point absorber expands and compresses the trapped volume of air which in turn expands and compresses the column of sea water; and
- a power take off, PTO, in communication with and responsive to air vented from the chamber resultant from a reaction of the heaving buoy point absorber against the top surface of the enclosed column of sea water, and wherein the PTO comprises one or more air turbines, the one or more air turbines are configurable such that their associated resistance to air flow is adjustable, the one or more air turbines are operably coupled to one or more generators and at least one of the one or more generators is operable for controlling the resistance to air flow associated with the one or more air turbines.

24. A wave energy converter comprising:
- a resonant heaving buoy point absorber which oscillates with a natural frequency of movement in a vertical direction approximate to the frequency of passing waves, the absorber comprising a surface piercing float operably coupled to an adjustable reference mass and a ballast, the ballast having a fixed mass and the adjustable reference mass defining a volume for accommodating sea water therein, wherein the adjustable reference mass comprises at least one aperture for accommodating sea water therethrough, the at least one aperture having an associated valve member for operatively adjusting the volume of sea water within the adjustable reference mass, the surface piercing float, the adjustable reference mass and the ballast being configured to rise and fall together in response to passing waves;
- a chamber provided within the surface piercing float and operably in fluid communication with the sea water to effect a trapping of a volume of air between a top surface of a column of sea water and a top surface of the chamber, the chamber being configured such that operably the resonant heaving buoy point absorber expands and compresses the trapped volume of air which in turn expands and compresses the column of sea water; and
- a power take off, PTO, in communication with and responsive to air vented from the chamber resultant from a reaction of the heaving buoy point absorber against the top surface of the enclosed column of sea water, and wherein the PTO comprises one or more air turbines, the one or more air turbines are configurable such that their associated resistance to air flow is adjustable;
- the wave energy converter further comprising a sensor for sensing an operating characteristic of the heaving buoy point absorber and wherein the resistance to air flow of the one or more turbines are varied in response to the sensed operating characteristic.

25. A wave energy converter comprising:
- a resonant heaving buoy point absorber which oscillates with a natural frequency of movement in a vertical direction approximate to the frequency of passing waves, the absorber comprising a surface piercing float operably coupled to an adjustable reference mass and a ballast, the ballast having a fixed mass and the adjustable reference mass defining a volume for accommodating sea water therein, wherein the adjustable reference mass comprises at least one aperture for accommodating sea water therethrough, the at least one aperture having an associated valve member for operatively adjusting the volume of sea water within the adjustable reference mass, the surface piercing float, the adjustable reference mass and the ballast being configured to rise and fall together in response to passing waves;
- a chamber provided within the surface piercing float and operably in fluid communication with the sea water to effect a trapping of a volume of air between a top surface of a column of sea water and a top surface of the chamber, the chamber being configured such that operably the resonant heaving buoy point absorber expands and compresses the trapped volume of air which in turn expands and compresses the column of sea water;
- a power take off, PTO, in communication with and responsive to air vented from the chamber resultant from a reaction of the heaving buoy point absorber against the top surface of the enclosed column of sea water; and
- an air storage mechanism for storing air under pressure wherein the air storage mechanism is in fluid communication with the trapped volume of air in the chamber.

26. The wave energy converter as claimed in claim 25, wherein the air storage mechanism comprises one or more tanks.

27. A wave energy converter comprising:
- a resonant heaving buoy point absorber which oscillates with a natural frequency of movement in a vertical direction approximate to the frequency of passing waves, the absorber comprising a surface piercing float operably coupled to an adjustable reference mass and a ballast, the ballast having a fixed mass and the adjustable reference mass defining a volume for accommodating sea water therein, wherein the adjustable reference mass comprises at least one aperture for accommodating sea water therethrough, the at least one aperture having an associated valve member for operatively adjusting the volume of sea water within the adjustable reference mass, the surface piercing float, the adjustable reference mass and the ballast being configured to rise and fall together in response to passing waves;

a chamber provided within the surface piercing float and operably in fluid communication with the sea water to effect a trapping of a volume of air between a top surface of a column of sea water and a top surface of the chamber, the chamber being configured such that operably the resonant heaving buoy point absorber expands and compresses the trapped volume of air which in turn expands and compresses the column of sea water;

a power take off, PTO, in communication with and responsive to air vented from the chamber resultant from a reaction of the heaving buoy point absorber against the top surface of the enclosed column of sea water;

a control mechanism configured for tuning one or more operating characteristics of the resonant heaving buoy point absorber; and an air storage mechanism for storing air under pressure wherein the control mechanism is operable for at least one of:
  selectively facilitating the charging of air from the chamber to the air storage mechanism;
  selectively facilitating the release of air from the air storage mechanism to the chamber.

28. A wave energy converter comprising:
a resonant heaving buoy point absorber which oscillates with a natural frequency of movement in a vertical direction approximate to the frequency of passing waves, the absorber comprising a surface piercing float operably coupled to an adjustable reference mass and a ballast, the ballast having a fixed mass and the adjustable reference mass defining a volume for accommodating sea water therein, wherein the adjustable reference mass comprises at least one aperture for accommodating sea water therethrough, the at least one aperture having an associated valve member for operatively adjusting the volume of sea water within the adjustable reference mass, the surface piercing float, the adjustable reference mass and the ballast being configured to rise and fall together in response to passing waves;

a chamber provided within the surface piercing float and operably in fluid communication with the sea water to effect a trapping of a volume of air between a top surface of a column of sea water and a top surface of the chamber, the chamber being configured such that operably the resonant heaving buoy point absorber expands and compresses the trapped volume of air which in turn expands and compresses the column of sea water;

a power take off, PTO, in communication with and responsive to air vented from the chamber resultant from a reaction of the heaving buoy point absorber against the top surface of the enclosed column of sea water; and wherein the relationship between the reference mass, a wave period and a water plane area of the buoy is approximately represented by the formula:

$$T = 2\pi \sqrt{\frac{Mf + Madded}{\rho g A}}$$

where T is the wave period, $M_f$ the inertial mass of sea water trapped in the reference mass, Madded is the added mass and is determined from the geometry and configuration of the device, $\rho$ is the density of sea water, g is gravity and A is the water-plane area of the surface-piercing buoy.

* * * * *